Nov. 19, 1935.  B. H. LINCOLN  2,021,865
PROCESS FOR CONVERTING HYDROGEN SULPHIDE INTO SULPHUR
Filed May 26, 1933
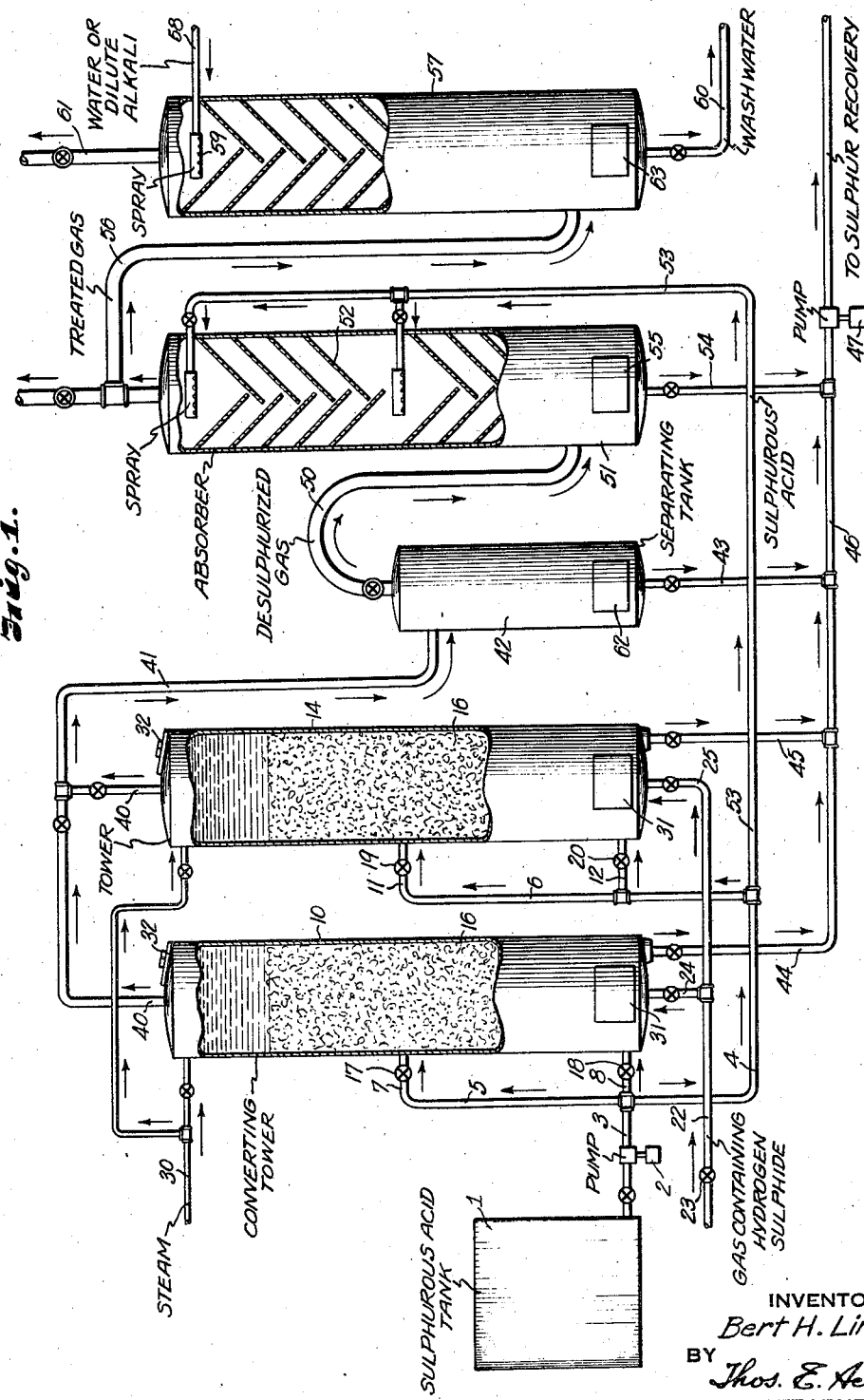
INVENTOR
*Bert H. Lincoln*
BY
*Thos. E. Acqfield*
ATTORNEY

UNITED STATES PATENT OFFICE 2,021,865

PROCESS FOR CONVERTING HYDROGEN SULPHIDE INTO SULPHUR

Bert H. Lincoln, Ponca City, Okla., assignor to Continental Oil Company, Ponca City, Okla., a corporation of Delaware Application May 26, 1933, Serial No. 673,021

1 Claim. (Cl. 23—226)

My invention relates to a process for converting hydrogen sulphide into sulphur.

Hydrogen sulphide is a common constituent of most hydrocarbon gases. The percentage of hydrogen sulphide in hydrocarbon gases as obtained in the production of petroleum will vary depending upon the producing field and the type of crude. The percentage of hydrogen sulphide may be very large and reach an amount of 10% by volume or more.

In cracking heavy hydrocarbons into lighter hydrocarbons the mercaptans and/or other sulphur compounds in the heavy hydrocarbons are in part broken down with hydrogen sulphide resulting. The hydrogen sulphide so produced contaminates the cracked gas coming from the cracking unit. In some cases hydrogen sulphide is released in the ordinary distillation of petroleum hydrocarbons either due to the heat converting the sulphur compound into hydrogen sulphide or due to the reduced solubility of hydrogen sulphide in the hydrocarbon oil at elevated temperature.

Hydrogen sulphide in hydrocarbon gases is as a rule a very objectionable constituent. It is a very active corrosive agent and has marked corrosive effect on certain types of metals encountered in the transportation and use of hydrocarbon gases. When the percentage by volume of hydrogen sulphide increases above a very low figure it makes the entire body of gaseous hydrocarbons dangerous due to its poisonous action. There are large volumes of natural hydrocarbon gases and gases formed during the cracking of the hydrocarbons that cannot be marketed for domestic consumption because of the high hydrogen sulphide content.

The object of my present invention is to provide a method and apparatus for the removal of hydrogen sulphide from gases such as hydrocarbon gases. Another object of my invention is to provide an economical method for the removal of hydrogen sulphide from hydrocarbon gases without diluting the hydrogen sulphide free gas with other gases such as nitrogen and oxygen.

In outline my process consists of the treatment of hydrogen sulphide containing gas with sulphurous acid in contact with a catalyst for the conversion of the hydrogen sulphide into sulphur and water.

The accompanying figure which forms a part of the specification and is to be read in conjunction therewith, discloses a schematic view of one apparatus capable of carrying out my invention.

When sulphurous acid contacts with hydrogen sulphide the following reaction occurs:

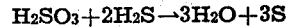

$$H_2SO_3 + 2H_2S \rightarrow 3H_2O + 3S$$

A tank 1 is provided for the storage of sulphurous acid which may be obtained by contacting sulphur dioxide with water. A pump 2 is adapted to pump sulphurous acid through line 3 and through branch line 4 to manifolds 5 and 6. Lines 7 and 8 extend from manifold 5 to tower 10. Lines 11 and 12 extend from manifold 6 to tower 14.

I have discovered that a reaction between hydrogen sulphide which may be contained in a hydrocarbon gas, and sulphurous acid may be more readily accomplished in a tower packed with inert or activated substances which act either to give an increased contacting surface or a catalytic action.

A substance which I have found particularly suitable as a catalyst is activated carbon from any source, or obtained from de-volatilized petroleum coke. The towers 10 and 14 are filled with the packing material 16, of a nature just described. Valves 17 and 18 control lines 7 and 8 so that sulphurous acid may be introduced into the tower through either lines 7 or 8 as desired. Valves 19 and 20 perform the same function with respect to tower 14. The gas containing hydrogen sulphide from any suitable source is introduced into line 22 which is controlled by valve 23 and passes through lines 24 and 25 to towers 10 and 14 respectively. If the sulphurous acid be delivered into the bottom of the towers, the gas containing hydrogen sulphide and the sulphurous acid will flow upwardly in parallel through towers 14 and 16. It is my intention, however, that only one of towers 16 or 14 be in use at one time so that, when the catalyst or inert material in one of the towers becomes contaminated by the collection of free sulphur, which may be precipitated, the other tower may be put in stream and the tower which has become contaminated be subjected to cleaning. This is done by means of steam which is introduced to line 30. I use high pressure steam opening manhole 31 to allow for cleaning out of the sulphur at the base of the tower. Manholes 32 are provided in the upper portion of the tower for the introduction of the contact material.

If a relatively strong solution of sulphurous acid is used in my process, I find it advisable to deliver the sulphurous acid to the middle portion of the tower to allow contact of any sulphur dioxide which may be released in the presence of the gas to react with the hydrogen sulphide which is contained in the gas. If the relatively strong sulphurous acid be delivered into the top of the tower, free sulphur dioxide will be blown from the solution before it has time to contact with the hydrogen sulphide.

The treated gas and sulphurous acid leaves the towers through lines 40 and passes into line 41 to separator 42. In the separator, the liquid containing elemental sulphur in suspension is withdrawn through line 43. I provide towers 10 and 14 with lines 44 and 45 leading from the lowest point thereof. These lines pass into the main 46 from which the liquid containing the sulphur in suspension is pumped by pump 47 to sulphur recovery. The sulphur may be recovered by settling, centrifuging, or filtering. It may be recovered either in the finely divided form being precipitated or may be melted and used in cores. The gases will be found to be substantially free of hydrogen sulphide. If traces of hydrogen sulphide are still present, the gas leaving the separator through line 50 may be passed into the baffle tower 51 containing baffle plates 52. A branch line 53 is connected to a sulphurous acid line 4 and may be introduced into tower 51 so that the gas coming from line 50 will pass countercurrent thereto. This tower is likewise provided with a line 54 for drawing off the sulphurous acid and/or water containing elemental sulphur in suspension. This line leads to line 46 as can be readily seen by reference to the drawing. A cleanout manhole 55 is provided. The treated gas is drawn from tower 51 through line 56 and passes into baffle tower 57 countercurrent to a spray of either water or a dilute alkaline solution to neutralize any traces of sulphurous acid which may be present in the gas. The sulphur water or alkali is introduced through line 58 to spray head 59. The sulphur water is withdrawn at the bottom of tower 57 to line 60 and the treated gas is withdrawn through line 61.

Any sulphur deposited in the lines or other equipment may be removed by the solvent action of carbon diosulphide or ammonium sulphide or be removed by blowing through with high pressure steam. Suitable manholes 62 and 63 are provided for cleaning out separator 42 and tower 57.

As an example of the results obtained by my process, a gas containing 3000 grains of hydrogen sulphide per 100 cubic feet was passed through a tower packed with glass beads through which a solution of sulphurous acid was percolated. The resulting gas contained 900 grains of hydrogen sulphide per 100 cubic feet. With a slower rate of flow of gas containing hydrogen or an increased quantity of sulphurous acid or with better contact surface, the hydrogen sulphide content of the treated gas could have been greatly reduced.

As another example of my process, a tower packed with a commercially available activated cocoanut charcoal was used as the contacting surface. A gas containing 3000 grains of hydrogen sulphide per 100 cubic feet was passed up through the tower and a solution of sulphurous acid percolated from the top of the tower. The gas resulting from this operation contained approximately 500 grains of hydrogen sulphide per 100 cubic feet.

The equipment should be so designed to operate under pressure. This is necessary since the gas to be treated will, as a rule, be under pressure. Even though there are many advantages in using pressures up to 75 pounds per square inch or above the process is operable at pressures only slightly above atmosphere or atmospheric. Temperatures up to the vaporization temperature of sulphurous acid (water) under the pressure employed may be used.

By controlling the rate of flow the concentration of sulphurous acid used and the amount of contact surface, it is possible to reduce the hydrogen sulphide content of a gas to 25 grains per 100 cubic feet or lower.

I have found that the desirable characteristics of my process are not obtained by the use of dry sulphur dioxide as a substitute for the sulphurous acid used. The water solution of sulphur dioxide (sulphurous acid) gives a much more rapid reaction than the dry sulphur dioxide.

Another desirable characteristic of sulphur dioxide water solution (sulphurous acid) not obtainable with dry sulphur dioxide is the fact that the water solution tends to wash the sulphur precipitated by the reaction from the reaction chamber and gives a convenient means of accumulating and collecting the sulphur formed by the reaction. The reaction rate with sulphurous acid being so much greater, allows the design of apparatus for the handling of any given volume of hydrogen sulphide containing gas to be made with much smaller equipment than is possible when using sulphur dioxide dry. As the examples show, the use of activated carbon improves the efficiently of sulphurous acid.

As previously mentioned, any sulphur dioxide remaining in the treated gas is easily removed by a water wash or a dilute alkali wash. Water may be employed since the solubility of sulphur dioxide in water provides a very economical and convenient means of removing the sulphur dioxide. When an extremely pure gas is required, a dilute solution of an alkali may be used as the final wash. Since the majority of the hydrogen sulphide has been removed from the gas, the amount of dilute alkali required would be very small and should provide a very economical method of obtaining a pure hydrocarbon gas free of sulphur dioxide and hydrogen sulphide.

It will be understood that certain features and sub-combinations are of utility and may be employed without reference to other features and sub-combinations. This is contemplated by and is within the scope of my claim. It is further obvious that various changes may be made in the details within the scope of my claim without departing from the spirit of my invention. It is therefore to be understood that my invention is not to be limited to the specific details shown in the drawing and described in the specification.

Having thus described my invention, what I claim is:

A process of removing hydrogen sulphide from a gaseous mixture containing the same including the steps of contacting the gas with sulphurous acid in an enlarged zone in the presence of activated carbon, whereby to convert a portion of the hydrogen sulphide into water and elemental sulphur, separating the gas from the products formed by the reaction, then passing the gas countercurrent to sulphurous acid to convert the remaining hydrogen sulphide into water and sulphur and then washing the treated gas.

BERT H. LINCOLN.